United States Patent
Singh et al.

(10) Patent No.: US 11,595,264 B1
(45) Date of Patent: Feb. 28, 2023

(54) PROVISIONING EDGE BACKHAULS FOR DYNAMIC WORKLOADS

(71) Applicant: MICROSOFT TECHNOLOGY LICENSING, LLC, Redmond, WA (US)

(72) Inventors: Rachee Singh, Redmond, WA (US); Sharad Agarwal, Seattle, WA (US); Ryan Andrew Beckett, Seattle, WA (US); Abhishek Udupa, Bellevue, WA (US); Paramvir Bahl, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/478,369

(22) Filed: Sep. 17, 2021

(51) Int. Cl.
*H04L 41/0896* (2022.01)
*H04L 41/14* (2022.01)

(52) U.S. Cl.
CPC .......... *H04L 41/0896* (2013.01); *H04L 41/14* (2013.01)

(58) Field of Classification Search
CPC ..... H04L 41/14; H04L 41/0896; H04L 47/76; H04L 41/149
See application file for complete search history.

(56) References Cited

U.S. PATENT DOCUMENTS

| | | | | |
|---|---|---|---|---|
| 9,979,657 | B2* | 5/2018 | Batrouni | H04L 67/566 |
| 2002/0059274 | A1* | 5/2002 | Hartsell | H04L 67/61 |
| 2019/0349254 | A1* | 11/2019 | Nolan | H04L 61/4505 |
| 2020/0167196 | A1* | 5/2020 | Smith | G06F 9/5094 |
| 2021/0144517 | A1* | 5/2021 | Guim Bernat | G06F 9/505 |
| 2021/0194821 | A1 | 6/2021 | Guim Bernat et al. | |

OTHER PUBLICATIONS

"International Search Report and Written Opinion Issued in PCT Application No. PCT/US22/037650", dated Oct. 4, 2022, 14 Pages.

* cited by examiner

*Primary Examiner* — Brian Whipple
(74) *Attorney, Agent, or Firm* — Newport IP, LLC; Han K. Gim (57) ABSTRACT

Network capacity is provisioned in a computing environment comprising a computing service provider and an edge computing network. A cost function is applied to usage data for a number of user endpoints at the edge computing network, a number and type of workloads at the edge computing network, offload capability of the edge computing network, and resource capacities at the edge computing network. An estimated network capacity is determined, where the workloads are dynamic, and the cost function is usable to optimize the network capacity with respect to one or more criteria.

20 Claims, 7 Drawing Sheets

PROVISIONING EDGE BACKHAULS FOR DYNAMIC WORKLOADS

BACKGROUND

A data center may house computer systems and various networking, storage, and other related components. Data centers may, for example, be used by cloud service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies.

It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management. It is desirable to provide the highest level of computing availability at an edge site while at the same time providing performance and minimizing cost.

When implementing edge computing, the network might be architected as a hierarchy of servers beginning close to where the data is generated to ending at servers that are part of the cloud. The described techniques can allow for the provisioning of capacity from the (near or far) operator edge to the cloud service provider. Capacity from the operator edge can be expensive and limited and provisioning the capacity typically requires analysis of the number of user endpoints (UE) that will be served by the edge and application workloads (video analytics, radio-access network, etc.) that the operator plans to run on the edge. Accurate estimation of these workloads can help to determine the capacity to provision while connecting the edge to the cloud network.

Some metrics that may be optimized while provisioning edge to data center capacity may include: 1) ensuring that all present and near-future demands of the operator workload are met and (2) the cost incurred in provisioning the edge is minimal. The challenges in estimating the provisioning needs include (1) dynamic user-side workloads and (2) compute load-balancing across edges for efficient use of resources. The described techniques address these and other challenges to provisioning edge to data center capacity while reducing cost and accounting for expected capacity needs.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

In cloud-based computing environments that provide virtualized computing and storage services, various computing and network services may be configured to enable the cloud service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility. As used herein, "resources" may refer to various types of multi-dimensional resources including CPU, GPU, memory, network capacity, etc.

Efficient provisioning and management of the end-to-end network capacity can enable an experience that is seamless and consistent when using edge sites. As used herein, provisioning an edge network may generally refer to processes for configuring the edge network and allocating and deploying resources to allow the edge network to provide desired services to its users. Provisioning may include altering the state of an existing service or capability, and may include configuration of various systems, communications links, and data resources.

The integration of local and remote resources with a comprehensive capacity provisioning approach can optimize the costs for the service provider and customers, and maximize the capabilities of the edge site. The effective and accurate estimation of network capacity can be determined based on the implications for various performance and security implications such as latency and data security.

The provisioning of capacity between edge sites and the cloud provider's data center can be complex. For example, the cloud service provider may implement multiple service regions and microregions. Some implementations may include dedicating a region and/or a microregion for a particular customer. Other implementations may involve the cloud service provider providing the cloud service provider's hardware resources to the customer for installation on their premises.

In many cases a network will have a mixture and hierarchy of edge sites, such as an on-premise edge, a network edge, and the cloud. In other examples, there may be more or less edge sites. One challenge is determining how to estimate capacity across the edges in a manner that optimizes the use of available resources in the network and at each edge site in order to achieve or optimize one or more objectives.

The present disclosure describes techniques and systems that enable the determination and provisioning of capacity from an edge site to the data center. Provisioning edge capacity can include analysis of the number of user endpoints (UE) that will be served by the edge, traffic volume, expected types of application workloads (e.g., video analytics, radio-access network, etc.) that the operator plans to run on the edge, the amount of caching capacity at the edge site, and other factors. Accurate estimation of these workloads can enable efficient determination of the capacity that should be provisioned while connecting the edge to the service provider's network, to meet current and future needs.

When determining the desired capacity, one objective is to optimize various metrics while provisioning. Such metrics may include 1) ensuring that all present and near-future demands of the operator workload are met and (2) the cost incurred in provisioning the edge is minimized. The challenges in optimizing these metrics while provisioning the capacity include (1) dynamic user-side workloads and (2) compute load-balancing across edges for efficient use of resources. For example, workloads are typically dynamic and can vary with periodic peaks and valleys, and with seasonal variations. Additionally, traffic can be load-balanced across other edge sites, requiring the analysis and modeling of capacities to these other edge sites.

In some embodiments, the disclosed embodiments may be implemented as a tool that can be used by data center operators for capacity planning. In an embodiment, the disclosed embodiments may be implemented as a tool for customers of the service provider. In some embodiments, the described techniques may be provided as a service that is accessible via a user interface. Such a user interface may be provided on a user computing device. The user interface may be provided in conjunction with an application that communicates to one or more systems that provide analysis and detection of SRLG points of failure. Some embodiments may use an application programming interface (API).

In one embodiment, a network provisioning function may be implemented that provides optimized provisioning estimates based on capacities, bandwidth, policies, and other inputs. The capacities at the edge network may continuously change, for example when new workloads are brought into the edge (e.g., from local users at the edge network), and therefore the network provisioning function can be configured to account for such variations based on expected workloads.

In some embodiments, the network provisioning function may determine provisioning capacity for a multi-level edge hierarchy based on a cost function. The cost function may allow for consideration of the various costs for implementing differing levels of networking capacity. The cost function may minimize or maximize an objective function that depends on the model's internal parameters along with other input data which are taken as consistent values in the algorithm. The network provisioning function may consider a plurality of factors to determine an optimal and balanced distribution of network capacity between the levels of edge hierarchy based on one or more constraints. Previous methods for provisioning network capacity do not consider the complexities of an edge architecture. The constraints for the cost function may include policies, service level agreements, customer inputs, ability to offload to other edge sites, and the like. The cost function may be linear or non-linear and may implement techniques such as a 0-1 loss function or a quadratic loss function.

In an embodiment, the inputs to the network provisioning function may include the following inputs:
  number of user endpoints at an edge site
  number and type of workloads at the edge site
  resource capacities of the edge site such as cache capacity—this can be a multi-dimensional resource vector
  offload capability (e.g., to other edge sites)
  Objective function: Combination of,
    a. Maximize network defined utility function
    b. Minimize cost of infrastructure
  Additional parameters for determining network capacity can include network statistics including round trip time (RTT), bandwidth, loss rates, jitter, etc.

In an embodiment, in order to determine a cost for a given network capacity, a model of the network behavior in the form of an annotated graph may be used. A linear program solver may be used to locate a substantially optimal capacity strategy that optimizes the use of available resources.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 1:
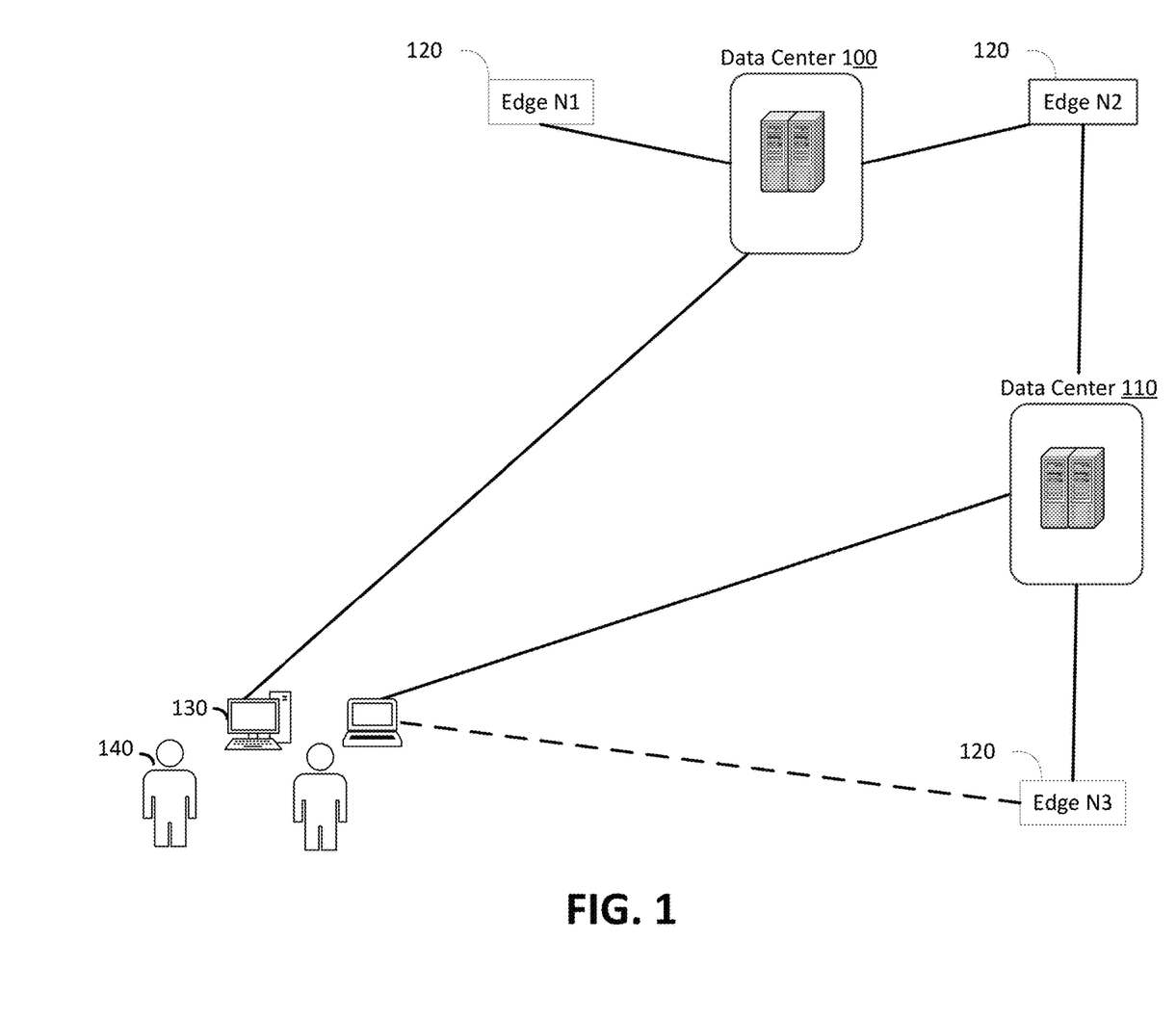
FIG. 1 is a diagram illustrating an example architecture in accordance with the present disclosure.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

Figure 2:
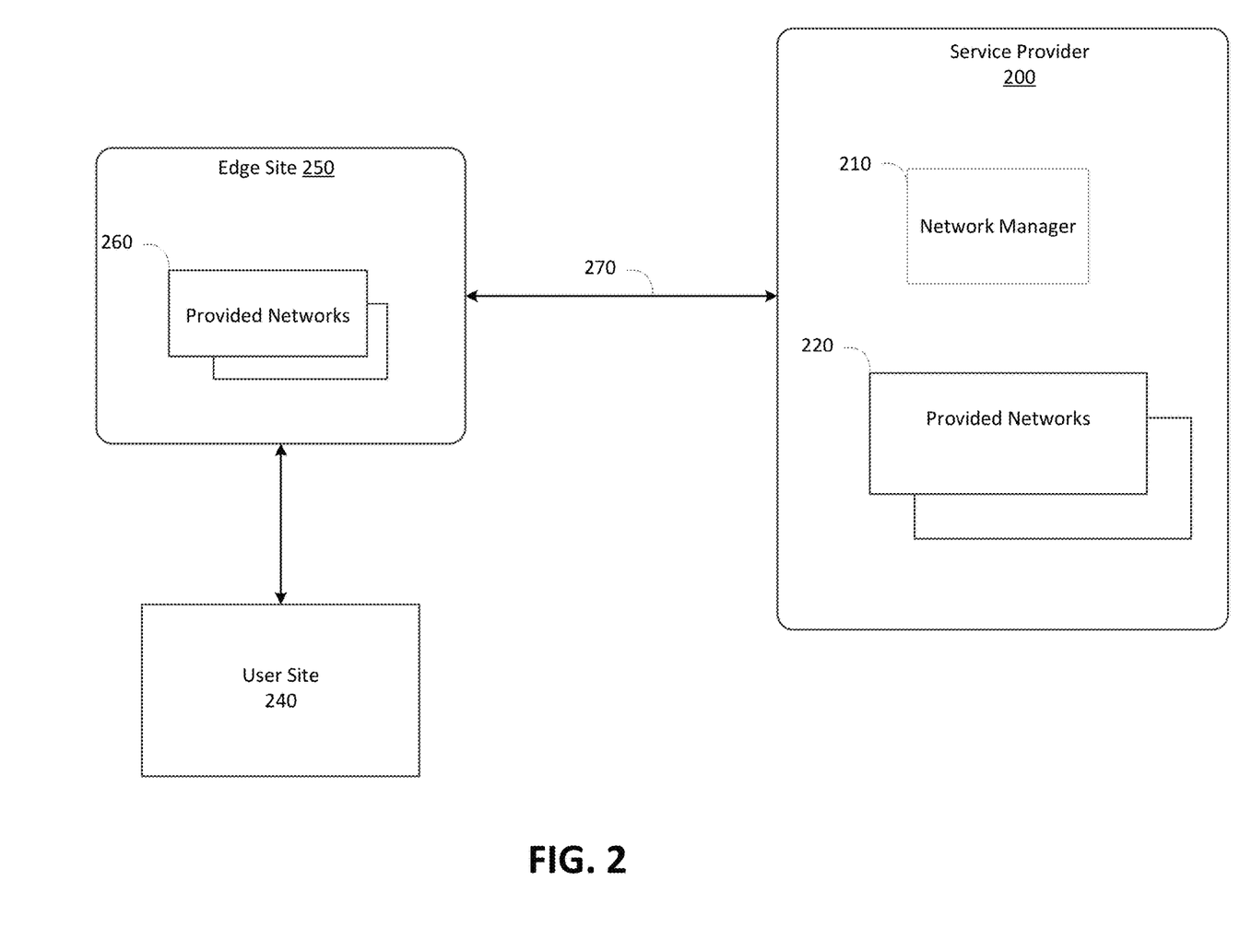
FIG. 2 is a diagram illustrating an example architecture in accordance with the present disclosure.

FIG. 2 illustrates an example computing environment in which the embodiments described herein may be implemented. FIG. 2 illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
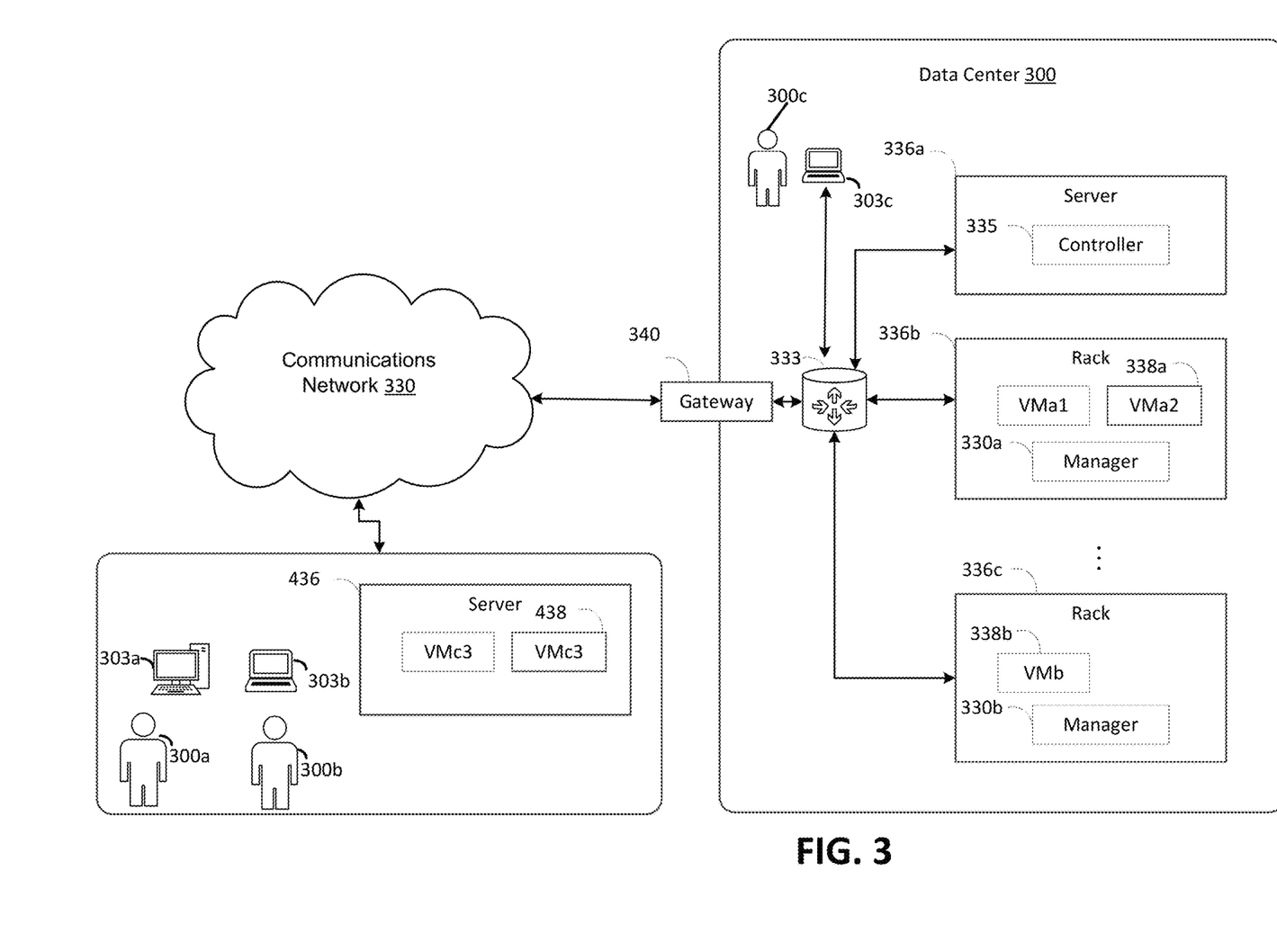
FIG. 3 is a diagram illustrating a data center and local resources in accordance with the present disclosure.

FIG. 3 illustrates an example computing environment in which the embodiments described herein may be implemented. FIG. 3 illustrates a data center 300 that is configured to provide computing resources to users 300*a*, 300*b*, or 300*c* (which may be referred herein singularly as "a user 300" or in the plural as "the users 300") via user computers 303*a*, 303*b*, and 303*c* (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to service provider 100 in FIGS. 1 and 2, or edge site 150 of FIG. 2. Data center 300 may include servers 336*a*, 336*b*, and 336*c* (which may be referred to herein singularly as "a server 336" or in the plural as "the servers 336") that may be standalone or installed in server racks, and provide computing resources available as virtual machines 338*a* and 338*b* (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303*a*, 303*b* or 303*c* may be a server, a desktop or laptop personal computer, a tablet computer, a smartphone, a set-top box, or any other computing device capable of accessing data center 300. User computer 303*a* or 303*b* may connect directly to the Internet (e.g., via a cable modem). User computer 303*c* may be internal to the data center 300 and may connect directly to the resources in the data center 300 via internal networks. Although only three user computers 303*a*, 303*b*, and 303*c* are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330*a* or 330*b* (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336*a* and 336*b*. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

FIG. 3 illustrates an edge site 420 that is geographically proximate to a facility local to users 300, in accordance with the present disclosure. In one embodiment, one or more servers 436 may be installed at the edge site 420. In an embodiment, servers 436 instantiate and run virtual machines 438.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 4:
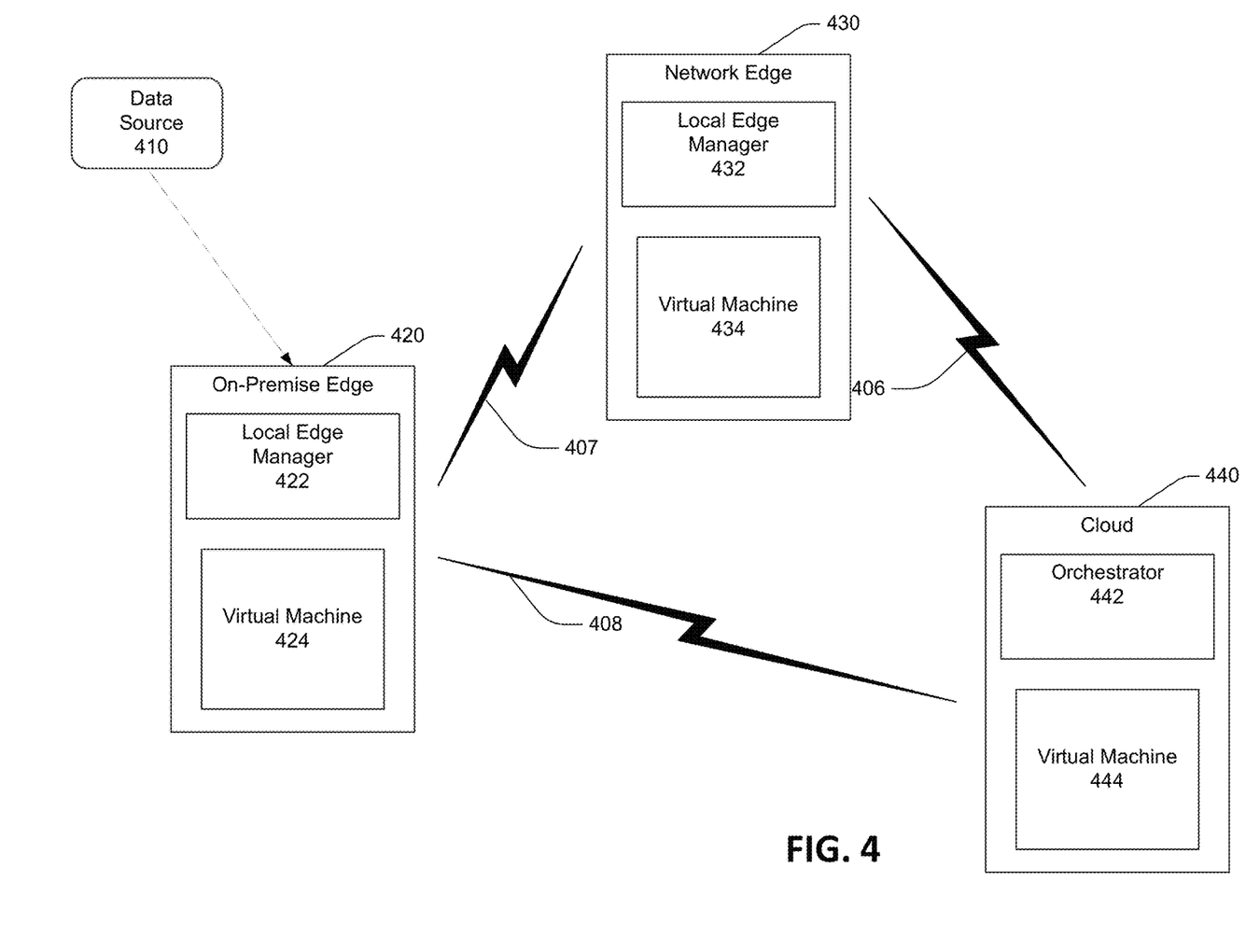
FIG. 4 is a diagram illustrating a provisioned architecture in accordance with the present disclosure.

With reference to FIG. 4, illustrated is one example architecture for providing management of computing resources and network capacity in accordance with the present disclosure. In an embodiment, the architecture may include an on-premise edge 420 that includes a local edge manager 422. The on-premise edge 420 may include resources such as virtual machine 424. In an embodiment, the architecture may include a network edge 430 that includes a local edge manager 432. The network edge 430 may include resources such as virtual machine 434. In an embodiment, the architecture may include a cloud node 440 that orchestrator 442. The cloud node 440 may include resources such as virtual machine 444. Data source 410 may provide data for initial processing by on-premise edge 420. Tasks of a processing pipeline may be processed at network edge 430. Additional tasks of the processing pipeline may be processed at the cloud node 440. The orchestrator 442 may cooperate with local edge manager 432 and local edge manager 422 to distribute data and tasks.

When provisioning network capacity, the flows to the cloud 440 may include not only the flow 408 from on-premise edge 420 to cloud node 440, but can also include the flow 407 from on-premise edge 420 to network edge 430 and flow from network edge 430 to cloud node 440. Thus the provisioning determination can consider the total capacity enabled by the ability to offload dataflows to network edge 430 (and other edge sites that are not shown). The consideration of offloading dataflows to network edge 430 may consider other factors such as latencies that may result from routing data through network edge 430.

Figure 5:
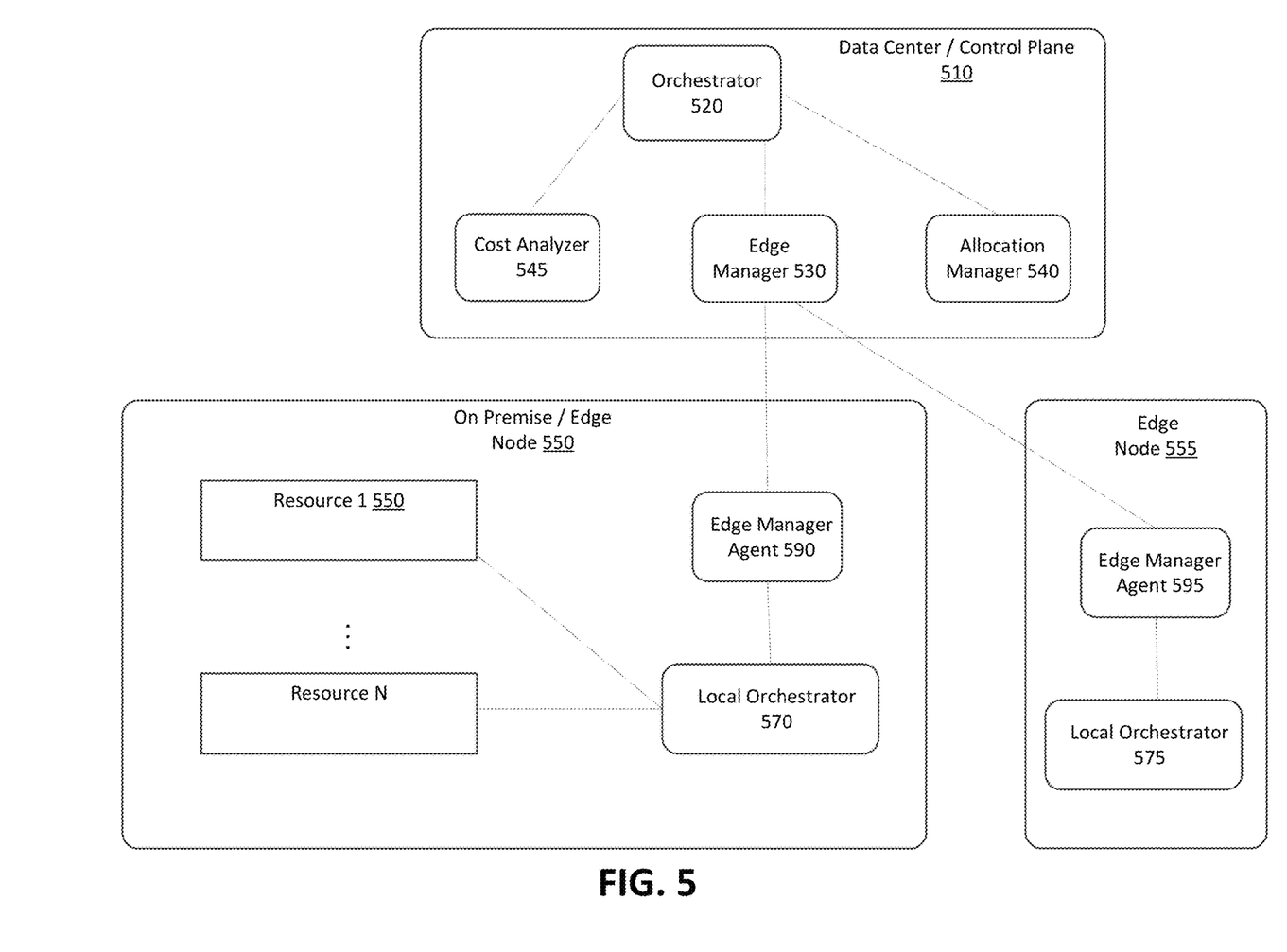
FIG. 5 is a diagram illustrating an architecture for provisioning resources in accordance with the present disclosure.

With reference to FIG. 5, illustrated is one example architecture for providing management of computing resources and network capacity in accordance with the present disclosure. In an embodiment, the architecture may include an edge node 550 that may include one or more resources 550. The edge node 550 may include local edge manager agent 590, which may be a service running on the edge node 550 and configured to monitor local resources and capacities. The edge manager agent 590 may be configured to track workloads that are being processed at the edge node 550 and may monitor various metrics including availability, read and write latency, etc. The current status of all resources may be sent to orchestrator 520 for performing actions as needed.

Edge manager agent 590 may be executed as a service running on the edge node 550. Edge manager agent 590 may be configured to receive requests for operations and data from edge manager 530 at the data center 510. The edge manager agent 590 may perform the requested operations at the edge node 550. A local orchestrator 570 may distribute tasks and data among resources at the edge node 550.

The orchestrator 520 may be located in the data center/control plane 510. The orchestrator 520 may be configured to receive information pertaining to resources and dataflows in an edge site. The information may be used to determine whether data should be routed through the edge node 555. The information may be used to determine whether a data flow should be offloaded to the edge node 555. The data offload may be complementary to the capacity that exists between data center/control plane 510 and edge node 550.

Allocation manager 540 may be configured to determine a suitable edge site for executing a given workload (e.g., virtual machines, containers, etc.). The allocation manager 540 may further be configured to maintain a list of all nodes at an edge site, their capabilities, and what workloads are currently running on each server node. The capability list may be modified when a new information is received from edge manager agent 550.

Figure 6:
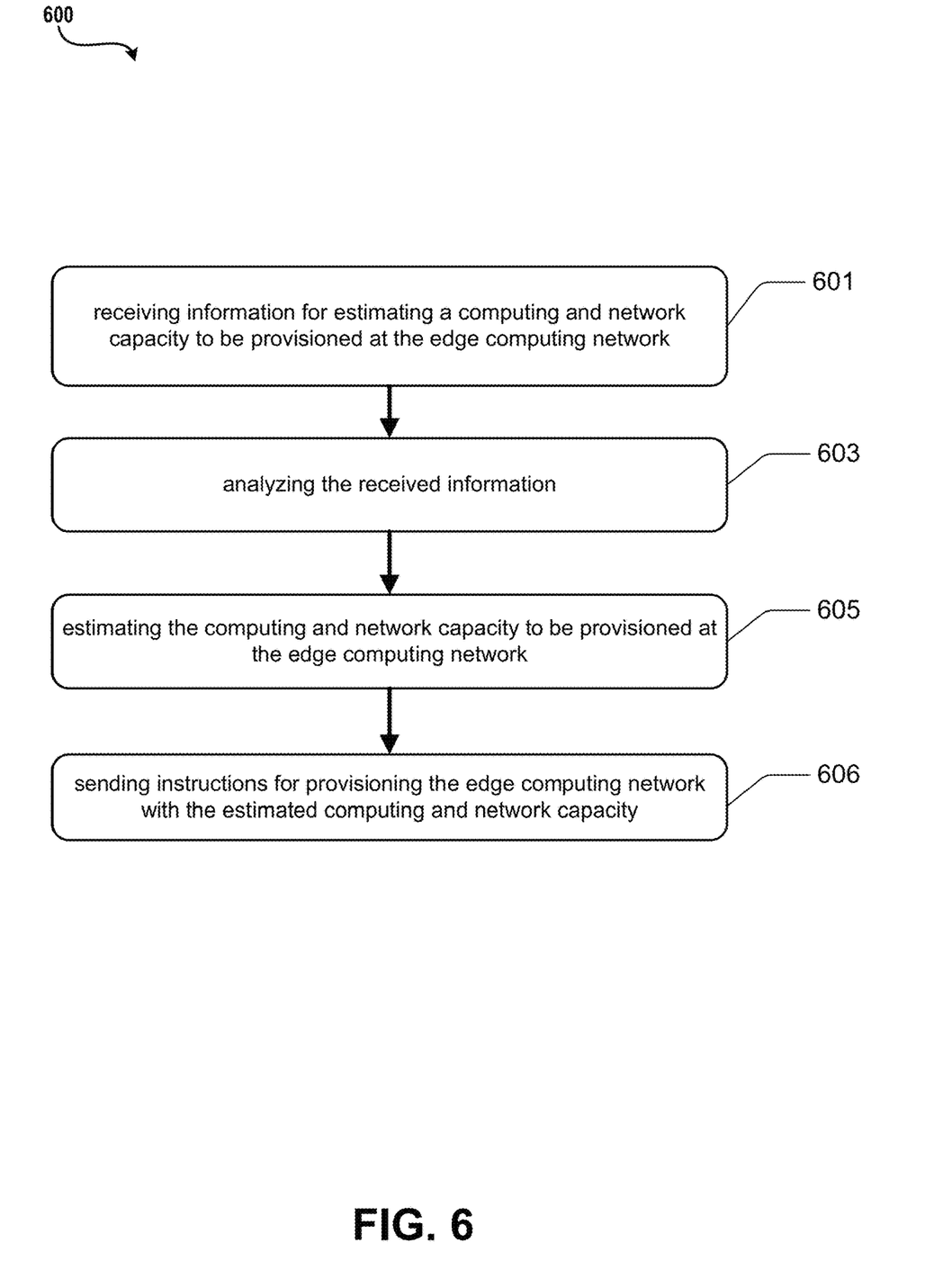
FIG. 6 is a flowchart depicting an example procedure for provisioning resources in accordance with the present disclosure.

Turning now to FIG. 6, illustrated is an example operational procedure for provisioning network capacity in accordance with the present disclosure. Such an operational procedure can be provided by one or more components illustrated in FIGS. 1 through 5. The operational procedure may be implemented in a computing environment comprising a computing service provider and an edge computing network. The edge computing network may comprise computing and storage devices configured to extend computing resources of the computing service provider to remote users of the computing service provider.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 6, operation 601 receiving information for estimating a computing and network capacity to be provisioned at the edge computing network. In an embodiment, the information comprises:

a number of user endpoints serviced by the edge computing network, a number and type of workloads to be performed at the edge computing network, offload capability to other edge computing networks, and resource capacities at the edge computing network, wherein the number and type of workloads and number of user endpoints at the edge computing network are variable over time.

Operation 601 may be followed by operation 603. Operation 603 illustrates analyzing the received information.

Operation 603 may be followed by operation 605. Operation 605 illustrates based on the analyzing, estimating the computing and network capacity to be provisioned at the edge computing network. In an embodiment, the computing and network capacity is determined to meet a cost threshold and one or more performance criteria for the edge computing network.

Operation 605 may be followed by operation 607. Operation 607 illustrates sending instructions for provisioning the edge computing network with the estimated computing and network capacity.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
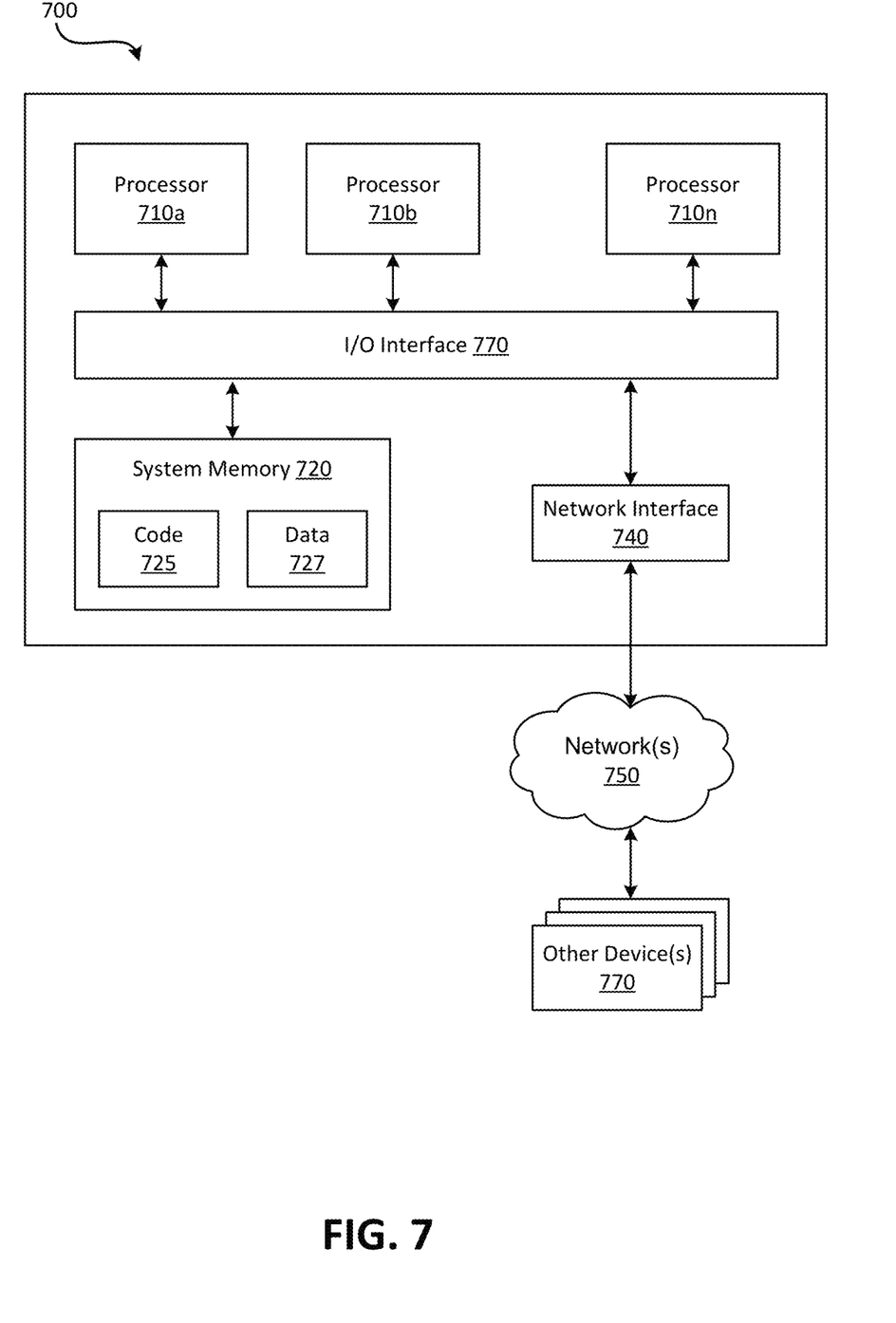
FIG. 7 is an example computing system in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 77 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 77 may be configured to store instructions and data accessible by processor(s) 710. In various embodiments, system memory 77 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 77, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 770, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for allocating computing and network capacity in a computing environment comprising a virtualized computing service provider and an edge computing network comprising computing, storage, and network devices configured to extend computing resources of the virtualized computing service provider to remote users of the computing service provider, the method performed by the virtualized computing service provider, the method comprising:

receiving information for estimating a computing and network capacity to be provisioned at the edge computing network, wherein the information comprises:

a number of user endpoints serviced by the edge computing network, a number and type of workloads to be performed at the edge computing network, offload capability to other edge computing networks, and resource capacities at the edge computing network, wherein the number and type of workloads and number of user endpoints at the edge computing network are variable over time;

analyzing the received information;

based on the analyzing, estimating the computing and network capacity to be provisioned at the edge computing network, wherein the computing and network capacity is determined to meet a cost threshold and one or more performance criteria for the edge computing network; and sending instructions for provisioning the edge computing network with the estimated computing and network capacity.

Clause 2: The method of clause 1, wherein the computing and network capacity includes an estimated bandwidth to be provisioned between the edge computing network and the virtualized computing service provider.

Clause 3: The method of any of clauses 1-2, wherein the computing and network resources at the edge computing network are determined during execution of workloads.

Clause 4: The method of any of clauses 1-3, wherein the determined capacity is further based on workload distributions.

Clause 5: The method of any of clauses 1-4, wherein the cost function is operable to determine an optimization of cost based on one or more constraints.

Clause 6: The method of any of clauses 1-5, wherein the constraints include a policy associated with a user of the edge computing network.

Clause 7: The method of clauses 1-6, wherein the information includes cache capacity at the edge computing network.

Clause 8: The method of any of clauses 1-7, wherein the offload capability to other edge computing networks includes a capacity for the other edge computing networks to provide computing and network capacity for workloads offloaded from the edge computing network.

Clause 9: A system for allocating computing and network capacity in a computing environment comprising a virtualized computing service provider and an edge computing network comprising computing, storage, and network devices configured to extend computing resources of the virtualized computing service provider to remote users of the computing service provider, the system comprising:

one or more processors; and a memory in communication with the one or more processors, the memory having computer-readable instructions stored thereupon that, when executed by the one or more processors, cause the system to perform operations comprising:

receiving information for estimating a computing and network capacity to be provisioned at the edge computing network, wherein the information comprises:
  a number of user endpoints serviced by the edge computing network,
  a number and type of workloads to be performed at the edge computing network,
  offload capability to other edge computing networks, and
  resource capacities at the edge computing network,
  wherein the number and type of workloads and number of user endpoints at the edge computing network are variable over time;
analyzing the received information;
based on the analyzing, estimating the computing and network capacity to be provisioned at the edge computing network, wherein the computing and network capacity is determined to meet a cost threshold and one or more performance criteria for the edge computing network; and
sending instructions for provisioning the edge computing network with the estimated computing and network capacity.

Clause 10: The system of clause 9, wherein the computing and network capacity includes an estimated bandwidth to be provisioned between the edge computing network and the virtualized computing service provider.

Clause 11: The system of any of clauses 9 and 10, wherein the cost function is operable to determine an optimization of cost based on one or more constraints.

Clause 12: The system of any clauses 9-11, wherein the constraints include a policy associated with a customer of the edge computing network.

Clause 13: The system of any clauses 9-12, wherein the information includes cache capacity.

Clause 14: A computer-readable storage medium having computer-executable instructions for allocating computing and network capacity in a computing environment comprising a virtualized computing service provider and an edge computing network comprising computing, storage, and network devices configured to extend computing resources of the virtualized computing service provider to remote users of the computing service provider, the medium having computer-executable instructions stored thereupon which, when executed by one or more processors of a computing device, cause the computing device to:

receive information for estimating a computing and network capacity to be provisioned at the edge computing network, wherein the information comprises:
  a number of user endpoints serviced by the edge computing network,
  a number and type of workloads to be performed at the edge computing network,
  offload capability to other edge computing networks, and
  resource capacities at the edge computing network,
  wherein the number and type of workloads and number of user endpoints at the edge computing network are variable over time;
analyze the received information;
based on the analyzing, estimate the computing and network capacity to be provisioned at the edge computing network, wherein the computing and network capacity is determined to meet a cost threshold and one or more performance criteria for the edge computing network; and
send instructions for provisioning the edge computing network with the estimated computing and network capacity.

Clause 15: The computer-readable storage medium of clause 14, wherein the computing and network capacity includes an estimated bandwidth to be provisioned between the edge computing network and the virtualized computing service provider.

Clause 16: The computer-readable storage medium of any of clauses 14 and 15, wherein the computing and network resources at the edge computing network are determined during execution of workloads.

Clause 17: The computer-readable storage medium of any of the clauses 14-16, wherein the information includes cache capacity.

Clause 18: The computer-readable storage medium of any of the clauses 14-17, wherein the offload capability to other edge computing networks includes a capacity for the other edge computing networks to provide computing and network capacity for workloads offloaded from the edge computing network.

Clause 19: The computer-readable storage medium of any of the clauses 14-18, wherein the cost function is operable to determine an optimization of cost based on one or more constraints.

Clause 20: The computer-readable storage medium of any of the clauses 14-19, wherein the constraints include a policy associated with a user of the edge computing network.

The invention claimed is:

1. A method for allocating computing and network capacity in a computing environment comprising a virtualized computing service provider and an edge computing network comprising computing, storage, and network devices configured to extend computing resources of the virtualized computing service provider to remote users of the computing service provider, the method performed by the virtualized computing service provider, the method comprising:
  receiving information for estimating a computing and network capacity to be provisioned at the edge computing network, wherein the information comprises:
    a number of user endpoints serviced by the edge computing network,
    a number and type of workloads to be performed at the edge computing network,
    capability to offload dataflows from an external data source to other edge computing networks, and
    resource capacities at the edge computing network, wherein the number and type of workloads, the dataflows, and number of user endpoints at the edge computing network are variable over time;
  analyzing the received information;
  based on the analyzing, estimating the computing and network capacity to be provisioned at the edge computing network, wherein the computing and network capacity is determined to meet a cost threshold and one or more performance criteria for the edge computing network and based on the capability to offload dataflows to other edge computing networks; and
  sending instructions for provisioning the edge computing network with the estimated computing and network capacity.

2. The method of claim 1, wherein the computing and network capacity includes an estimated bandwidth to be provisioned between the edge computing network and the virtualized computing service provider.

3. The method of claim 2, wherein the computing and network resources at the edge computing network are determined during execution of workloads.

4. The method of claim 1, wherein the determined capacity is further based on workload distributions.

5. The method of claim 1, wherein the cost function is operable to determine an optimization of cost based on one or more constraints.

6. The method of claim 5, wherein the constraints include a policy associated with a user of the edge computing network.

7. The method of claim 1, wherein the information includes cache capacity at the edge computing network.

8. The method of claim 1, wherein the offload capability to other edge computing networks includes a capacity for the other edge computing networks to provide computing and network capacity for workloads offloaded from the edge computing network.

9. A system for allocating computing and network capacity in a computing environment comprising a virtualized computing service provider and an edge computing network comprising computing, storage, and network devices configured to extend computing resources of the virtualized computing service provider to remote users of the computing service provider, the system comprising:
   one or more processors; and
   a memory in communication with the one or more processors, the memory having computer-readable instructions stored thereupon that, when executed by the one or more processors, cause the system to perform operations comprising:
   receiving information for estimating a computing and network capacity to be provisioned at the edge computing network, wherein the information comprises:
      a number of user endpoints serviced by the edge computing network,
      a number and type of workloads to be performed at the edge computing network,
      capability to offload dataflows from an external data source to other edge computing networks, and
      resource capacities at the edge computing network, wherein the number and type of workloads, the dataflows, and number of user endpoints at the edge computing network are variable over time;
   analyzing the received information;
   based on the analyzing, estimating the computing and network capacity to be provisioned at the edge computing network, wherein the computing and network capacity is determined to meet a cost threshold and one or more performance criteria for the edge computing network; and
   sending instructions for provisioning the edge computing network with the estimated computing and network capacity.

10. The system of claim 9, wherein the computing and network capacity includes an estimated bandwidth to be provisioned between the edge computing network and the virtualized computing service provider.

11. The system of claim 9, wherein the cost function is operable to determine an optimization of cost based on one or more constraints.

12. The system of claim 11, wherein the constraints include a policy associated with a customer of the edge computing network.

13. The system of claim 10, wherein the information includes cache capacity.

14. A computer-readable storage medium having computer-executable instructions for allocating computing and network capacity in a computing environment comprising a virtualized computing service provider and an edge computing network comprising computing, storage, and network devices configured to extend computing resources of the virtualized computing service provider to remote users of the computing service provider, the medium having computer-executable instructions stored thereupon which, when executed by one or more processors of a computing device, cause the computing device to:
   receive information for estimating a computing and network capacity to be provisioned at the edge computing network, wherein the information comprises:
      a number of user endpoints serviced by the edge computing network,
      a number and type of workloads to be performed at the edge computing network,
      capability to offload dataflows from an external data source to other edge computing networks, and
      resource capacities at the edge computing network, wherein the number and type of workloads, the dataflows, and number of user endpoints at the edge computing network are variable over time;
   analyze the received information;
   based on the analyzing, estimate the computing and network capacity to be provisioned at the edge computing network, wherein the computing and network capacity is determined to meet a cost threshold and one or more performance criteria for the edge computing network; and
   send instructions for provisioning the edge computing network with the estimated computing and network capacity.

15. The computer-readable storage medium of claim 14, wherein the computing and network capacity includes an estimated bandwidth to be provisioned between the edge computing network and the virtualized computing service provider.

16. The computer-readable storage medium of claim 15, wherein the computing and network resources at the edge computing network are determined during execution of workloads.

17. The computer-readable storage medium of claim 15, wherein the information includes cache capacity.

18. The computer-readable storage medium of claim 14, wherein the offload capability to other edge computing networks includes a capacity for the other edge computing networks to provide computing and network capacity for workloads offloaded from the edge computing network.

19. The computer-readable storage medium of claim 18, wherein the cost function is operable to determine an optimization of cost based on one or more constraints.

20. The computer-readable storage medium of claim 19, wherein the constraints include a policy associated with a user of the edge computing network.

* * * * *